E. B. AIGUIER.
SAFETY CATCH.
APPLICATION FILED MAY 7, 1910.

980,856.

Patented Jan. 3, 1911.

Witnesses:
Philip S. McLean.
Teresa V. Lynch

Inventor
Edward B. Aiguier
By his Attorneys
Brock Becker Smith

UNITED STATES PATENT OFFICE.

EDWARD B. AIGUIER, OF NEWARK, NEW JERSEY, ASSIGNOR TO RICHARDSON MANUFACTURING COMPANY, A CORPORATION OF NEW JERSEY.

SAFETY-CATCH.

980,856. Specification of Letters Patent. Patented Jan. 3, 1911.

Application filed May 7, 1910. Serial No. 559,931.

*To all whom it may concern:*

Be it known that I, EDWARD B. AIGUIER, a citizen of the United States, and a resident of Newark, in the county of Essex and State of New Jersey, have invented certain new and useful Improvements in Safety-Catches, of which the following is a specification.

My invention relates to improvements in safety catches for pins, brooches and the like.

The object of my invention is to prevent accidental withdrawal of the pin point from the guard, and to accomplish this result in a simple and economical manner.

The invention resides in the combination with an open sided guard for the reception of the pin point, of a latch, which is pivoted in the guard so as to swing in a plane parallel to the open side of the guard and to thereby close up the open side of the guard after the pin point has been inserted therein.

Another feature of the invention consists in completely housing the so-called latch within the guard and so that there shall be no protruding members except for a small point or projection which extends slightly beyond the general outlines of the guard for the purpose of manipulating the latch.

Other features of the invention will appear as the specification proceeds.

In the accompanying drawings there is illustrated a preferred embodiment of the invention, but it will be understood that various changes and modifications may be made therein without departing from the spirit and scope of the invention.

Figure 1:
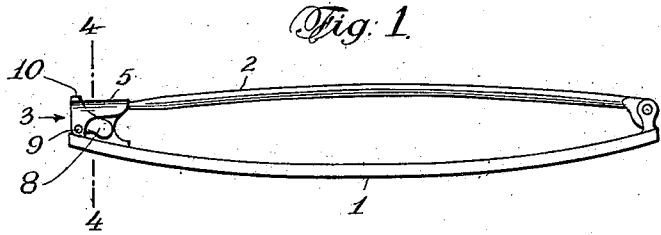
Figure 2:
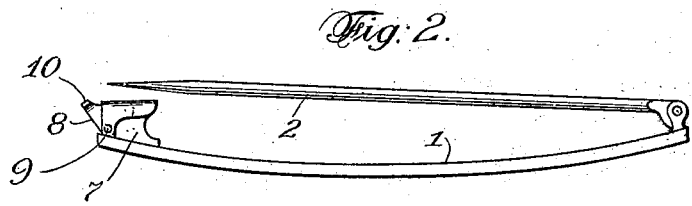
Figure 3:
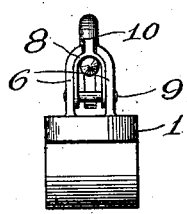
Figure 4:
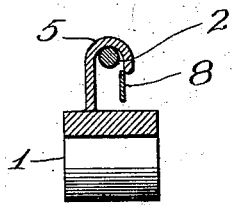
Figure 5:
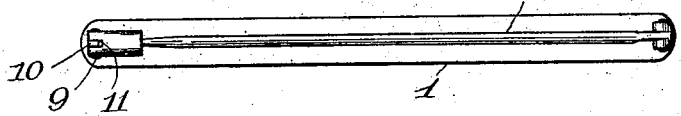

In the drawings: Figure 1 is a side elevation of a brooch or pin equipped with my invention, showing the pin as housed in the guard and the safety catch in its operative position. Fig. 2 is a view similar to Fig. 1 except that the safety catch has here been operated to release the pin from the guard. Fig. 3 is an end view of the invention looking in the direction of the arrow 3 in Fig. 1. Fig. 4 is a sectional view of the safety catch taken on the line 4—4 of Fig. 1, and Fig. 5 is a top plan view of the invention.

Like reference characters denote corresponding parts throughout the several views.

The safety catch in the present instance is shown as applied to an ordinary bar pin, the body of which is designated 1, and the pin proper, 2. The safety catch consists of a guard 5 having substantially parallel side walls 6, one of which is left open as at 7 for a portion of its extent to permit the pin point to be engaged within the guard, and for the purpose of retaining the pin point within the guard, I employ a member in the form of a latch 8, which is movable in a plane parallel to the plane of the open side of the guard so as to constitute a closure to such open side of the guard. A convenient way of mounting this latch is by pivoting it to swing on a pintle 9, extending between the sides of the guard. In this way the latch is completely housed within the general outlines of the guard as shown in Fig. 1, and for the purpose of operating the latch, it is preferably provided with a projection 10 which extends slightly beyond the general outline of the guard. This projection, by means of which the latch is operated, is preferably received in a notch or recess 11 in the upper side of the guard.

What is claimed, is:

A safety catch for brooches and the like, comprising, in combination with the brooch and the pin point carried thereby, a guard having substantially parallel sides connected at the top to form a housing for the pin point and the lower portion of one of said sides being cut away to receive the pin point, a latch located between the parallel sides of the guard having a portion to normally serve as a closure to the cut away portion of the guard, a pivot support for said latch located in the base portion of the guard farthest from the point of support of the pin point, and the latch being adapted to swing in a plane parallel to the length of the pin point, whereby when the latch is swung to open up the guard, the portion of the latch which normally serves as a closure to the open side portion of the guard, will be received in the upper closed portion of the guard.

Signed at New York in the county of New York and State of New York this 4 day of May. A. D. 1910.

EDWARD B. AIGUIER.

Witnesses:
LAURA E. SMITH,
PHILIP S. McLEAN.